US011979651B2

(12) United States Patent
Wang et al.

(10) Patent No.: US 11,979,651 B2
(45) Date of Patent: May 7, 2024

(54) IMAGE ACQUISITION APPARATUS

(71) Applicant: JINGDONG TECHNOLOGY INFORMATION TECHNOLOGY CO., LTD., Daxing Beijing (CN)

(72) Inventors: Hui Wang, Beijing (CN); Gengxun Xie, Beijing (CN); Chongshan Wang, Beijing (CN)

(73) Assignee: Jingdong Technology Information Technology Co, Ltd, Beijing (CN)

( * ) Notice: Subject to any disclaimer, the term of this patent is extended or adjusted under 35 U.S.C. 154(b) by 138 days.

(21) Appl. No.: 17/770,910

(22) PCT Filed: Jul. 22, 2020

(86) PCT No.: PCT/CN2020/103636
§ 371 (c)(1),
(2) Date: Apr. 21, 2022

(87) PCT Pub. No.: WO2021/077826
PCT Pub. Date: Apr. 29, 2021

(65) Prior Publication Data
US 2022/0400191 A1 Dec. 15, 2022

(30) Foreign Application Priority Data
Oct. 22, 2019 (CN) .......................... 201911008504.7

(51) Int. Cl.
*H04N 23/54* (2023.01)
*F16M 11/04* (2006.01)
(Continued)

(52) U.S. Cl.
CPC ........... *H04N 23/54* (2023.01); *F16M 11/045* (2013.01); *F16M 11/046* (2013.01);
(Continued)

(58) Field of Classification Search
None
See application file for complete search history.

(56) References Cited

U.S. PATENT DOCUMENTS

2008/0219652 A1* 9/2008 Pitkin .................... G03B 15/06
396/4
2017/0223807 A1* 8/2017 Recker ...................... H02J 7/34
(Continued)

FOREIGN PATENT DOCUMENTS

CN 102538675 A 7/2012
CN 105320141 A 2/2016
(Continued)

OTHER PUBLICATIONS

International Search Report in the international application No. PCT/CN2020/103636, dated Sep. 16, 2020.
(Continued)

*Primary Examiner* — Eileen M Adams
(74) *Attorney, Agent, or Firm* — Finch & Maloney PLLC

(57) ABSTRACT

Provided is an image acquisition apparatus. The image acquisition apparatus includes: a moving member, a lifting member, and an image acquisition member. The moving member can move on a bearing surface; the lifting member is provided on the moving member; the image acquisition member is movably connected to the lifting member; the image acquisition member can move in a first direction parallel to the axis of the lifting member, and/or can move in a second direction vertical to the first direction.

20 Claims, 3 Drawing Sheets

(51) Int. Cl.
  *F16M 11/18*    (2006.01)
  *F16M 11/42*    (2006.01)
  *G03B 15/03*    (2021.01)
  *H04N 7/18*     (2006.01)
  *H04N 23/51*    (2023.01)
  *H04N 23/695*   (2023.01)
  *H05B 47/11*    (2020.01)

(52) U.S. Cl.
  CPC ............ *F16M 11/18* (2013.01); *F16M 11/42* (2013.01); *G03B 15/03* (2013.01); *H04N 7/18* (2013.01); *H04N 23/51* (2023.01); *H04N 23/695* (2023.01); *H05B 47/11* (2020.01)

(56) References Cited

U.S. PATENT DOCUMENTS

| | | | | |
|---|---|---|---|---|
| 2018/0054553 | A1* | 2/2018 | Choi | H04N 13/243 |
| 2018/0321503 | A1* | 11/2018 | Brown | G02B 27/646 |
| 2018/0341818 | A1* | 11/2018 | Steffanson | G08B 13/19656 |

FOREIGN PATENT DOCUMENTS

| | | |
|---|---|---|
| CN | 105485482 A | 4/2016 |
| CN | 205697532 U | 11/2016 |
| CN | 106891319 A | 6/2017 |
| CN | 206300618 U | 7/2017 |
| CN | 206728172 U | 12/2017 |
| CN | 108156351 A | 6/2018 |
| CN | 207603078 U | 7/2018 |
| CN | 207648378 U | 7/2018 |
| CN | 207706318 U | 8/2018 |
| CN | 108500991 A | 9/2018 |
| CN | 208051937 U | 11/2018 |
| CN | 208060987 U | 11/2018 |
| CN | 109038353 A | 12/2018 |
| CN | 109079740 A | 12/2018 |
| CN | 109397241 A | 3/2019 |
| CN | 109506108 A | 3/2019 |
| CN | 109685709 A | 4/2019 |
| CN | 110809132 A | 2/2020 |
| CN | 210148107 U | 3/2020 |
| JP | H09149309 A | 6/1997 |
| KR | 20180055025 A | 5/2018 |
| WO | 2018010091 A1 | 1/2018 |

OTHER PUBLICATIONS

English translation of the Written Opinion of the International Search Authority in the international application No. PCT/CN2020/103636, dated Sep. 16, 2020.
First Office Action of the Chinese application No. 201911008504.7, dated May 12, 2020.
Third Office Action of the Chinese application No. 201911008504.7, dated Oct. 10, 2020.
Supplementary European Search Report in the European application No. 20880252.0, dated Oct. 20, 2022.

* cited by examiner

IMAGE ACQUISITION APPARATUS

CROSS-REFERENCE TO RELATED APPLICATION

The present disclosure is based on and claims priority to Chinese Patent Application No. 201911008504.7, filed on Oct. 22, 2019, the contents of which are hereby incorporated by reference in its entirety.

TECHNICAL FIELD

The present disclosure relates to the field of electronics and information technology, and in particular to an image acquisition apparatus.

BACKGROUND

With the continuous development of information technology industry most of the telecommunication and power departments of enterprises and governments are provided with computer rooms for storing servers. The computer rooms are usually provided with multiple cabinets, minicomputers and servers. The computer rooms are configured to provide automated information technology services to employees or customers, and are important parts of modern information technology industry.

In order to ensure the normal operation of the service, image acquisition apparatuses are used to monitor the conditions of physical environment and devices in the computer room. The image acquisition apparatus can collect images through an image acquisition component to acquire ambient environment information. However, many cabinets in the computer room are equipped with doors with the mesh structure. In order to realize the smooth collection of images by the image acquisition apparatus, it is necessary to open the doors in advance, which reduces the adaptability of the image acquisition apparatus to the inspection environment.

SUMMARY

Embodiments of the present disclosure are expected to provide an image acquisition apparatus, which solves the problem that the adaptability of the image acquisition apparatus to the inspection environment is reduced due to the fact that many cabinets in the computer room in related art are equipped with doors with the mesh structure and it is necessary to open the doors in advance in order to realize the smooth collection of images by the image acquisition apparatus.

The technical scheme of the present disclosure is implemented as follows:

An image acquisition apparatus includes: a moving member movable on a bearing surface; a lifting member provided on the moving member; and an image acquisition member movably connected to the lifting member. The image acquisition member is movable in a first direction parallel to an axis of the lifting member and/or in a second direction vertical to the first direction.

In some embodiments, the image acquisition member includes: a housing having a first opening; an image acquisition component disposed within the housing and having a lens exposed through the first opening. Herein the moving member is configured to control operation of the image acquisition component.

In some embodiments, the image acquisition component includes an industrial camera, a thermal infrared camera and a monitoring camera. Herein the industrial camera is configured to capture a target object to obtain feature information of the target object. The thermal infrared camera is configured to capture the target object to obtain thermal distribution information of the target object. The monitoring camera is configured to acquire video information in real time.

In some embodiments, the image acquisition member further includes: a bracket fixedly connected to the housing; and a light bar disposed on the bracket. The light bar is electrically connected to a controller in the moving member and the controller is configured to control lighting of the light bar.

In some embodiments, the bracket includes: a first bracket fixedly connected to the housing; and a second bracket fixedly connected to the housing.

The light bar accordingly includes: a first light bar disposed on the first bracket; and a second light bar disposed on the second bracket. Herein the first light bar and the second light bar are respectively disposed on both sides of the image acquisition component.

In some embodiments, the housing has a second opening and the image acquisition member further includes a connection block partially passing through the second opening. A first end of the connection block is inside the housing. A second end of the connection block is outside the housing. The second end of the connection block is movably connected to the lifting member. The image acquisition member further includes a drive mechanism connected to the first end of the connection block. The drive mechanism is configured to control the connection block to move in the second direction.

In some embodiments, the drive mechanism includes: a drive component connected to a first end of a stem and configured to drive the stem to rotate; the stem that has a second end connected to a first end of a link; and the link that has a second end connected to the first end of the connection block. Herein the stem is configured to drive the link to move when being rotated. The movement of the link drives the connection block to move in the second direction.

In some embodiments, the drive component includes a servo control board electrically connected to the controller in the moving member. The servo control board is configured to receive a first instruction from the controller and control operation of a servo based on the first instruction. the drive component further includes the servo that is configured to drive the stem to rotate when operating.

In some embodiments, the drive mechanism further includes: at least one guide shaft fixedly disposed relative to the housing and parallel to the second direction. Herein the connection block has at least one guide hole matched with the at least one guide shaft. The at least one guide shaft is movably connected to the connection block through the at least one guide hole. The at least one guide shaft cooperates with the at least one guide hole to enable the connection block to move in the second direction.

In some embodiments, the moving member includes a controller configured to send a second instruction to the lifting member and a first instruction to the image acquisition member. The lifting member is accordingly configured to move the image acquisition member in the first direction based on the second instruction. The image acquisition member is movable in the second direction based on the first instruction.

In some embodiments, the controller is configured to receive a first image for a target object from the image acquisition member and send the first instruction to the image acquisition member in response to determining that a mesh door exists in front of the target object based on the first image. The image acquisition member is configured to acquire a second image for the target object after moving in the second direction based on the fast instruction and send the second image to the controller. The controller is configured to determine feature information of the target object based on the first image and the second image when the image acquisition member is at a current height.

In some embodiments, the controller is configured to acquire a set of images acquired by the image acquisition member and obtain feature information of the target object based on the set of images at each of multiple different heights. Herein multiple sets of images are obtained based on the multiple different heights, and the multiple sets of images include the first image and the second image.

In some embodiments, the controller is configured to receive a third image for the target object from the image acquisition member, determine a current environmental parameter based on the third image and send a third instruction to the image acquisition member in the case that the current environmental parameter is smaller than a target environment parameter. The image acquisition member is configured to enable illumination of the light bar in the image acquisition member based on the third instruction.

In some embodiments, the moving member further includes a light sensor configured to detect an ambient lightness and send the ambient lightness to the controller. The controller is accordingly configured to send a third instruction to the image acquisition member in response to determining that the ambient lightness is smaller than a target ambient lightness. The image acquisition member is configured to enable illumination of the light bar in the image acquisition member based on the third instruction.

By applying one or at least two embodiments of the present disclosure, the following beneficial effects can be achieved. At least two images for the target object can be acquired at different positions so as to obtain overall structure of the target object by analyzing the acquired at least two images, thereby avoiding the process of opening the doors in advance in the related art and improving the adaptability of the image acquisition apparatus to the inspection environment. High-precision on-site images and thermal distribution information of the device in the computer room can be obtained, and the operation status of the devices in the computer room can be monitored. Clear device images can still be obtained in the dark environment, so that the adaptability to the weak light and dark environment can be improved.

In the embodiments of the present disclosure, the image acquisition apparatus includes a moving member, a lifting member and an image acquisition member. The moving member is movable on a bearing surface. The lifting member is provided on the moving member. The image acquisition member is movably connected to the lifting member and is movable in a first direction parallel to an axis of the lifting member and/or in a second direction vertical to the first direction. The image acquisition member can move at different positions relative to the lifting member, so that at least two images for the target object can be acquired at different positions in despite of the fact that there are still mesh doors in the images acquired by the image acquisition member. The overall structure of the target object can be obtained by analyzing the acquired at least two images, thereby avoiding the process of opening the doors in advance in the related art and improving the adaptability of the image acquisition apparatus to the inspection environment.

BRIEF DESCRIPTION OF THE DRAWINGS

The drawings are incorporated herein and form part of the present description, which illustrate embodiments in accordance with the present disclosure and are used together with the description to explain the technical scheme of the present disclosure.

DETAILED DESCRIPTION

The following describes the technical schema of the embodiments of the present disclosure clearly and completely with reference to the accompanying drawings in the embodiments of the present disclosure.

It should be understood that "embodiments/methods of the present disclosure" or "foregoing embodiments/methods" or "some embodiments/methods" mentioned throughout the description means that specific features, structures or characteristics related to the embodiments are included in at least one embodiment of the present disclosure. Therefore, "in the embodiments/methods of the present disclosure" or "in the foregoing embodiments/methods" or "in some embodiments/methods" appearing throughout the description may not necessarily refer to the same embodiments. Furthermore, the specific features, structures or characteristics may be combined in any suitable manner in one or more embodiments. In various embodiments of the present disclosure, sequence numbers of the foregoing processes do not mean execution sequences. The execution sequences of the processes should be determined according to functions and internal logic of the processes, and should not be construed as any limitation on the implementation processes of the embodiments of the present disclosure. The above-mentioned numerals of the embodiments of the present disclosure are only for description, and do not represent the advantages and disadvantages of the embodiments.

Figure 1:
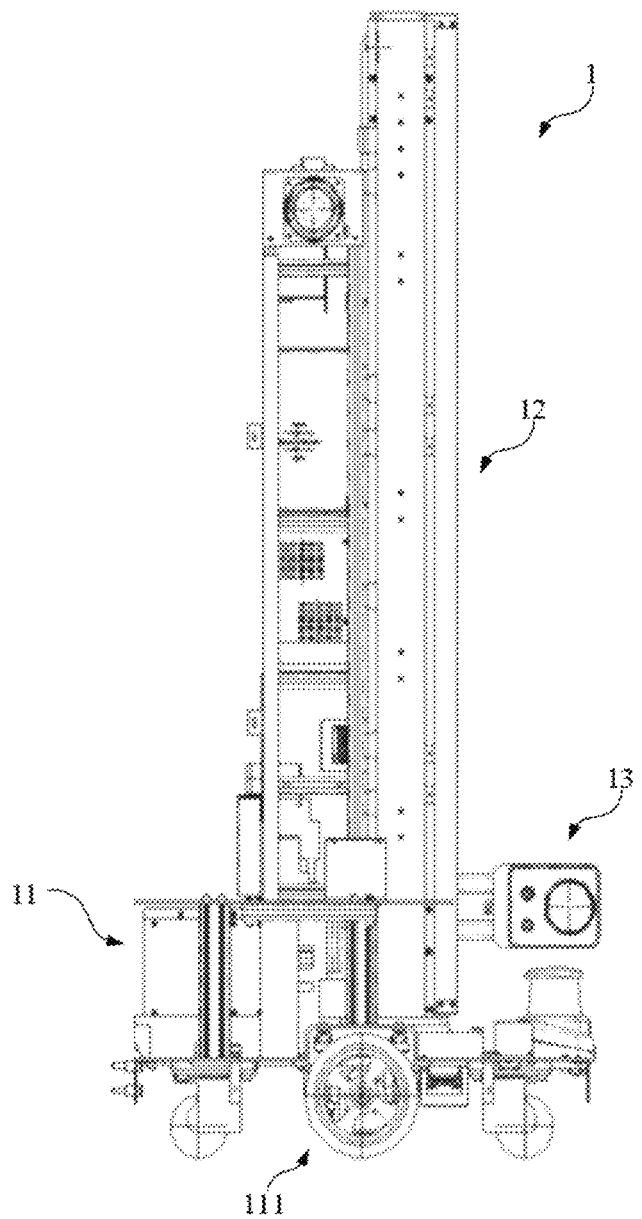
FIG. 1 is a structural diagram of an image acquisition apparatus according to an embodiment of the present disclosure.

Embodiments of the present disclosure provide an image acquisition apparatus. Referring to FIG. 1. FIG. 1 is a structural diagram of an image acquisition apparatus according to an embodiment of the present disclosure. The image acquisition apparatus includes a moving member 11, a lifting member 12 and an image acquisition member 13.

In the embodiments of the present disclosure, the moving member 11 is movable on a bearing surface.

The image acquisition apparatus 1 may be a robot, and the robot may be an inspection robot, a camera robot, a mobile robot, or the like.

The moving member 11 may include a moving component 111. The moving component 111 may have a wheel structure, and the image capturing apparatus 1 is moved on the bearing surface by the rolling of the wheel structure on the bearing surface. The bearing surface can be ground or other surface, and the bearing surface can be horizontal or inclined.

The moving member 11 may further include a controller (not shown), which may be a core board of the image acquisition apparatus 1. The controller can be configured to control the movement of the entire image acquisition apparatus 1 and control the relative position of each component and/or the image acquisition member 13 to acquire images. In an embodiment, the controller may receive a movement instruction from an external device and control the moving member 11 to move accordingly based on the movement instruction. In another embodiment, the controller may call a movement program stored internally and control the moving member 11 to move based on the movement program. For example, when the image acquisition apparatus 1 is the inspection robot, in an application scenario that the image acquisition is performed on multiple devices in the computer room, the moving member 11 can automatically pass through each of the devices in turn and capture each of the devices.

In the embodiments of the present disclosure, the lifting member 12 is provided on the moving member 11.

The lifting member 12 is fixedly connected to the moving member 11. The lifting member 12 and the moving component 111 are provided on opposite sides of the moving member 11. For example, the moving component 111 is provided on the lower side of the moving member 11, and the lifting member 12 may be provided on the upper side of the moving member 11. The lifting member 12 may be provided perpendicular to the moving member 11 or perpendicular to the moving direction of the moving member 11. The lifting member 12 may be linear or curved (e.g., arc or parabola), which is not limited in the embodiments of the present disclosure, as long as the lifting member 12 can lift and lower the image acquisition member 13 relative to the lifting member 12.

The image acquisition member 13 is movably connected to the lifting member 12. The image acquisition member 13 is movable in a first direction parallel to an axis of the lifting member 12 and/or in a second direction vertical to the first direction.

For example, referring to FIG. 1, when the lifting member 12 is vertical, the image acquisition member 13 can move in the first direction parallel to the axis of the lifting member 12. That is, the image acquisition member 13 may moves upward or downward along the lifting member 12. The image acquisition member 13 can move in the second direction vertical to the first direction. That is, the image acquisition member 13 may move left or right. The distance between the image acquisition member 13 and the lifting member 12 can be changed by the movement of the image acquisition member 13 in the second direction. For example, the distance between the image acquisition member 13 and the lifting member 12 is the shortest when the image acquisition member 13 reaches a first position (e.g., the reachable leftmost position) by the movement in the second direction, and the distance between the image acquisition member 13 and the lifting member 12 is the longest when the image acquisition member 13 reaches a second position (e.g., the reachable rightmost position) by the movement in the second direction. In some embodiments, the movement of the image acquisition member 13 in the second direction may be the rotation of the image acquisition member 13 around the lifting member 12.

In the embodiment of the present disclosure, the image acquisition member 13 can move in the first direction relative to the lifting member 12, and can move in the second direction relative to the lifting member 12, so that the target object can be captured in all directions. In an embodiment, the image acquisition member 13 cannot move in the second direction when moving in the first direction, or the image acquisition member 13 cannot move in the first direction when moving in the second direction. In another embodiment, the image acquisition member 13 can move in the second direction and in the first direction at the same time.

In an embodiment, the image acquisition apparatus 1 may include a body (not shown) and a connection block (the connection block may be the connection block 135 mentioned below). One end of the connection block is connected to the body and the other end is connected to the lifting member 12. The body is drawn to move in the first direction by the movement of the connection block in the first direction. The body is drawn to move in the second direction by the extension and retraction of connecting block in the body, thereby moving the image acquisition apparatus 1 in the second direction.

The controller may send a first instruction to the image acquisition member 13. The image acquisition member 13 controls the connection block to extend or retract based on the first instruction. For example, after capturing the target object to obtain a first image, the image acquisition member 13 may move in the second direction (shown as moving to the left or right in FIG. 1) based on the first instruction, and capture the target object to obtain a second image after the movement. The image acquisition member 13 may transmit the first image and the second image to the controller, and the controller may obtain a mesh-free image for the target object based on the first image and the second image. In another embodiment, the controller may send a first instruction to the lifting member 12 to control the lifting member 12 to move the image acquisition member 13 in the second direction.

The controller may send a second instruction to the lifting member 12 so that the lifting member 12 may move the image acquisition member 13 in the first direction based on the second instruction. For example, after the image acquisition member 13 captures the target object to obtain the second image, the controller may send the second instruction to the lifting member 12, and the lifting member 12 may move the image acquisition member 13 upward or downward relative to the lifting member 12 based on the second instruction. For example, the image acquisition member 13 may be moved upward by a distance of ½, ⅓, ¼ or the like of the length of the lifting member 12 based on the second direction.

In the embodiment of the present disclosure, the image acquisition member 13 may acquire two images at each of multiple heights, respectively. The controller may obtain feature information of the target object based on the two images acquired at each of the multiple heights. In other embodiments, the controller may send the two images acquired at each of the multiple heights to other electronic apparatuses to enable the other electronic apparatuses to analyze the images. By such misaligned capture of the target object, the feature information of the target object can be obtained and the image acquisition apparatus 1 can be controlled accordingly.

In an embodiment, the controller may analyze the first image when acquiring the first image from the image acquisition member 13, and send the first instruction to the image acquisition member 13 in response to determining that the first image has a feature of mesh door. In response to determining that the first image does not have the feature of mesh door, the controller does not send the first instruction to the image acquisition member 13, but sends the second instruction to the lifting member 12. In another embodiment, the controller sends a first instruction to the image acquisition member 13 regardless of whether the first image has the feature of mesh door.

In an embodiment, the image acquisition apparatus 1 may send the first instruction to the image acquisition member 13 in response to determining that the image acquisition apparatus is moved to a predetermined position. The predetermined position is configured to represent that a mesh door exists in front of the target object at the current position. The predetermined position may be located by its own positioning module or may be transmitted by other devices.

It should be noted that the target object mentioned in the embodiments of the present disclosure may be any device that needs to be analyzed, such as, a server, a cabinet, a minicomputer or other electronic devices etc., which is not limited herein.

The image acquisition apparatus according to the embodiments of the present disclosure includes the moving member, the lifting member and the image acquisition member. The moving member is movable on the bearing surface. The lifting member is provided on the moving member. The image acquisition member is movably connected to the lifting member and is movable in the first direction parallel to an axis of the lifting member and/or in the second direction vertical to the first direction. The image acquisition member can move at different positions relative to the lifting member, so that at least two images for the target object can be acquired at different positions in despite of the fact that there are still mesh doors in the images acquired by the image acquisition member. The overall structure of the target object can be obtained by analyzing the acquired at least two images, thereby avoiding the process of opening the doors in advance in the related art and improving the adaptability of the image acquisition apparatus to the inspection environment.

Based on the embodiments mentioned above, embodiments of the present disclosure provide an image acquisition apparatus. As shown in FIGS. 2 to 5, the image acquisition apparatus 1 includes the moving member 11, the lifting member 12 and the image acquisition member 13. The connection relationship among the moving member 11, the lifting member 12 and the image acquisition member 13 may be the same as that in the embodiments corresponding to FIG. 1.

Figure 2:
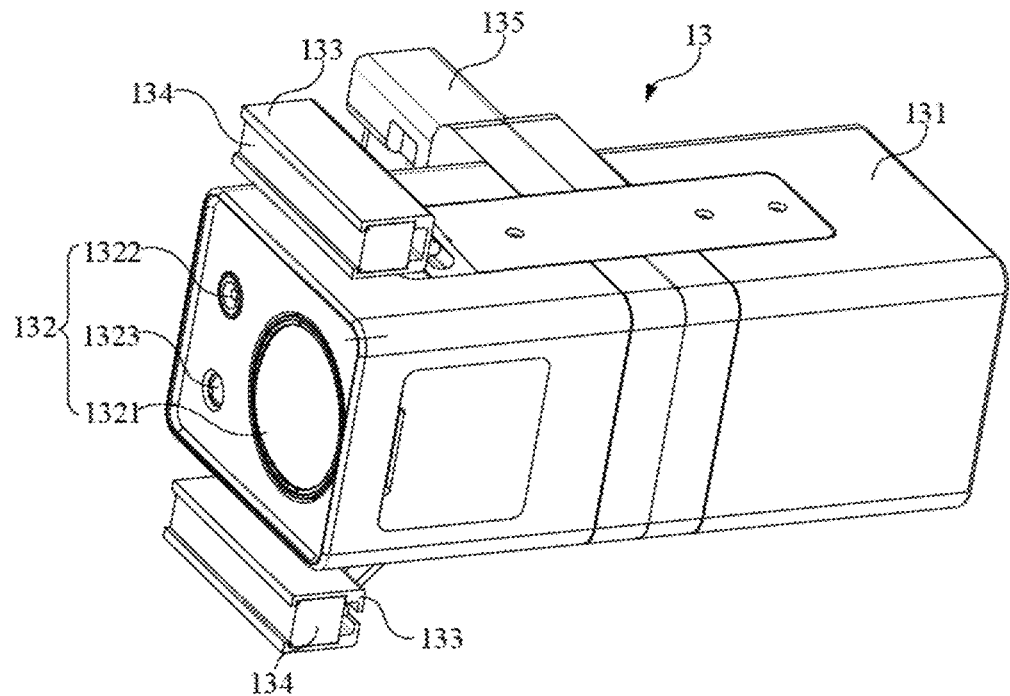
FIG. 2 is a structural diagram of an image acquisition member according to an embodiment of the present disclosure.
Figure 3:
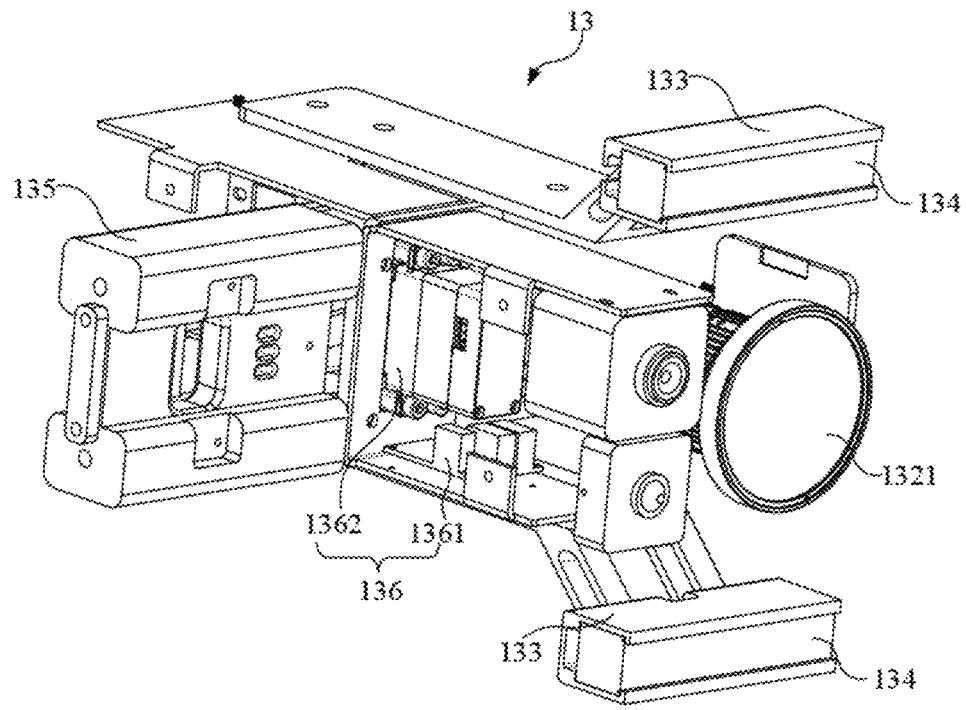
FIG. 3 is a structural diagram of an image acquisition member with the housing removed according to an embodiment of the present disclosure.

Referring to FIG. 2, in the embodiments of the present disclosure, the image acquisition member 13 includes a housing 131 and an image acquisition component 132.

The housing 131 has a first opening. The image acquisition component 132 is disposed within the housing 131 and has a lens exposed through the first opening. The moving member 11 is configured to control operation of the image acquisition component 132.

In the embodiments of the present disclosure, the image acquisition component 132 includes an industrial camera 1321, a thermal infrared camera 1322 and a monitoring camera 1323. The industrial camera 1321 is configured to capture the target object to obtain feature information of the target object. The thermal infrared camera 1322 is configured to capture the target object to obtain thermal distribution information of the target object. The monitoring camera 1323 is configured to acquire video information in real time.

After receiving the first instruction, the image acquisition component 132 may control the industrial camera 1321 to acquire the image for the target object, or control the industrial camera 1321 and the thermal infrared camera 1322 to acquire images for the target object, respectively. The controller can control the monitoring camera 1323 to operate all the time, so that the monitoring camera 1323 can acquire the environmental image around the image acquisition member 13 all the time, and the relevant personnel can monitor and control the image acquisition apparatus 1 based on the environmental image. In an embodiment, the thermal infrared camera 1322 may also operate all the time to acquire images in the computer room, thereby obtaining the temperature distribution in the computer room.

The acquisition accuracy of the industrial camera 1321 is greater than that of the thermal infrared camera 1322 or the monitoring camera 1323. The first opening may include a first sub-opening, a second sub-opening, and a third sub-opening. The first sub-opening, the second sub-opening and the third sub-opening are all circular. The industrial camera 1321 is exposed through the first sub-opening. The thermal infrared camera 1322 is exposed through the second sub-opening. The monitoring camera 1323 is exposed through the third sub-opening. The size of the first sub-opening may be larger than the size of the second sub-opening or the size of the third sub-opening. The lines connecting the center of the first sub-opening, the center of the second sub-opening and the center of the third sub-opening may form a triangle.

By providing the industrial camera 1321 with high acquisition accuracy, high-precision images for the target object can be acquired. By providing the thermal infrared camera 1322, the thermal distribution information for the target object and its surroundings can be acquired, thereby determining the temperature information of the target object and its surroundings based on the thermal distribution information. By providing the monitoring camera 1323, the personnel can intuitively learn information in the computer room through the monitoring video.

In the embodiments of the present disclosure, the image acquisition member 13 may further include a bracket 133 and a light bar 134.

The bracket 133 is fixedly connected to the housing 131. The light bar 134 is disposed on the bracket 133 and is electrically connected to the controller in the moving member 11. The controller is configured to control lighting of the light bar 134.

In other embodiments, the image acquisition apparatus 1 may not include the bracket 133, and the light bar 134 may be disposed directly on the surface of the housing 131.

In the embodiments of the present disclosure, the bracket 133 may include a first bracket and a second bracket, and the light bar 134 may include a first light bar and a second light bar. The first bracket is fixedly connected to the housing 131. The second bracket fixedly connected to the housing 131. The first light bar is disposed on the first bracket, and the second light bar is disposed on the second bracket. Each of the first light bar and the second light bar is disposed on a respective side of the image acquisition component 132. Each of the first bracket and the second bracket may correspond to a respective one of the two corresponding brackets 133 in FIG. 2. Each of the first light bar and the second light bar may correspond to a respective one of the two corresponding light bars 134 in FIG. 2.

In other embodiments, there may be other numbers of brackets 133 and light bars 134, for example, one, three or four, etc.

In some embodiments, the lightness of the light bar 134 may be changed. For example, the controller may analyze the acquired image to obtain the current ambient lightness, and control the light bar 134 to emit light matching the ambient lightness. It should be understood that the lower the ambient lightness, the brighter the light emitted by the light bar 134. For another example, the image acquisition apparatus 1 is provided with ambient light sensor. The controller may acquire ambient lightness from the ambient light sensor to control the light bar 134 to emit light matching the ambient lightness.

In an embodiment, the light bar 134 may emit light when the industrial camera 1321 acquires images, and at this time, the light bar 134 functions as a flash, so that light can be supplied to the shooting environment by the light emitted by the light bar 134. In some embodiments, the first instruction may carny information that enables the illumination of the light bar 134. In another embodiment, the light bar 134 may be tuned on all the time when the image acquisition apparatus 1 operates, thereby facilitating the acquisition of high-quality images by the monitoring camera 1323.

Still referring to FIGS. 2 to 5, the housing 131 has a second opening, and the image acquisition member 13 further includes a connection block 135 and a drive mechanism (including 136, 137, 138, and 139).

The connection block 135 partially passes through the second opening. A first end of the connection block 135 is inside the housing 131, and a second end of the connection block 135 is outside the housing 131. The second end of the connection block 135 is movably connected to the lifting member 12. The drive mechanism is connected to the first end of the connection block 135 and is configured to control the connection block to move in the second direction.

A connection board 1311 may be fixed inside the housing 131. The drive mechanism may be fixed to the connection board 1311.

In the embodiments of the present disclosure, the drive mechanism may include a drive component 136, a stem 137 and a link 138.

The drive component 136 is connected to a first end of the stem 137 and is configured to drive the stem 137 to rotate. A second end of the stem 137 is connected to a first end of the link 138. A second end of the link 138 is connected to the first end of the connection block 135. The stem 137 configured to drive the link to move when being rotated. The movement of the link 138 drives the connection block 135 to move in the second direction.

The stem 137, the link 138 and the connection block 135 may form a slider-crank mechanism. The rotation of the stem 137 drives the connection block 135 to move in the second direction.

In the embodiments of the present disclosure, the drive component 136 may include a servo control board 1361 and a servo 1362.

The servo control board 1361 is electrically connected to the controller in the moving member 11. The servo control board 1361 is configured to receive the first instruction from the controller and control operation of the servo 1362 based on the first instruction. The servo is configured to drive the stem 137 to rotate when operating.

The servo control board 1361 may be fixed to the housing 131. The servo 1362 may be fixed to the connection board 1311. The servo 1362 and the stem 137 may be provided on opposite sides of the connection board 1311.

The drive mechanism further includes a guide shaft 139.

The guide shaft 139 fixedly disposed relative to the housing 131 and is parallel to the second direction. The connection block 135 has a guide hole matched with the guide shaft 139. The guide shaft 139 is movably connected to the connection block 135 through the guide hole. The guide shaft 139 cooperates with the guide hole to enable the connection block 135 to move in the second direction.

Figure 4:
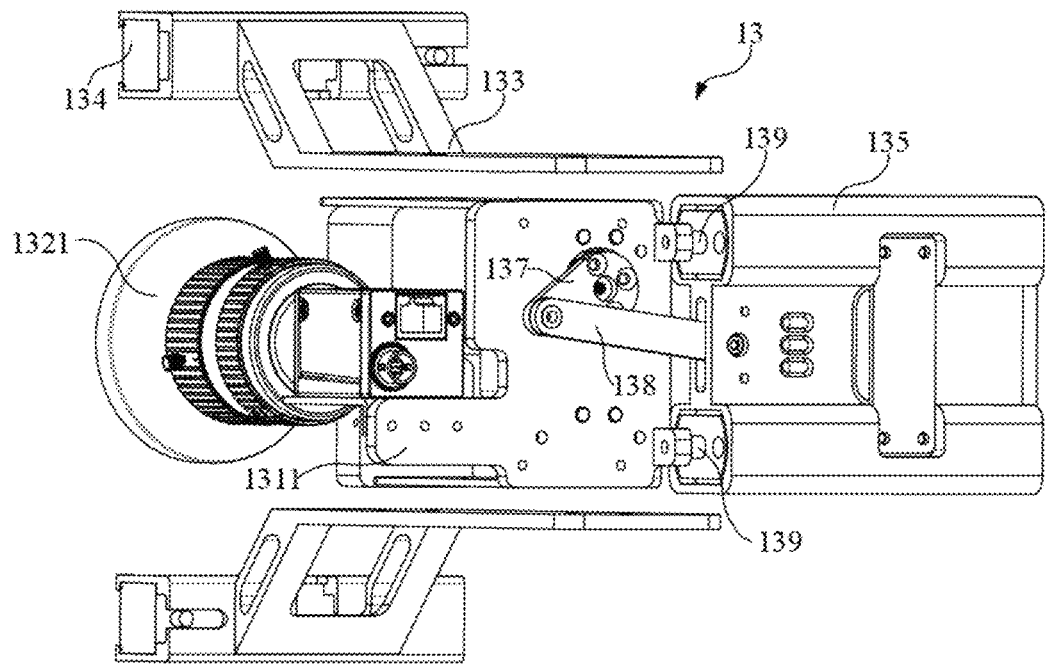
FIG. 4 is a structural diagram of another image acquisition member with housing removed according to an embodiment of the present disclosure.
Figure 5:
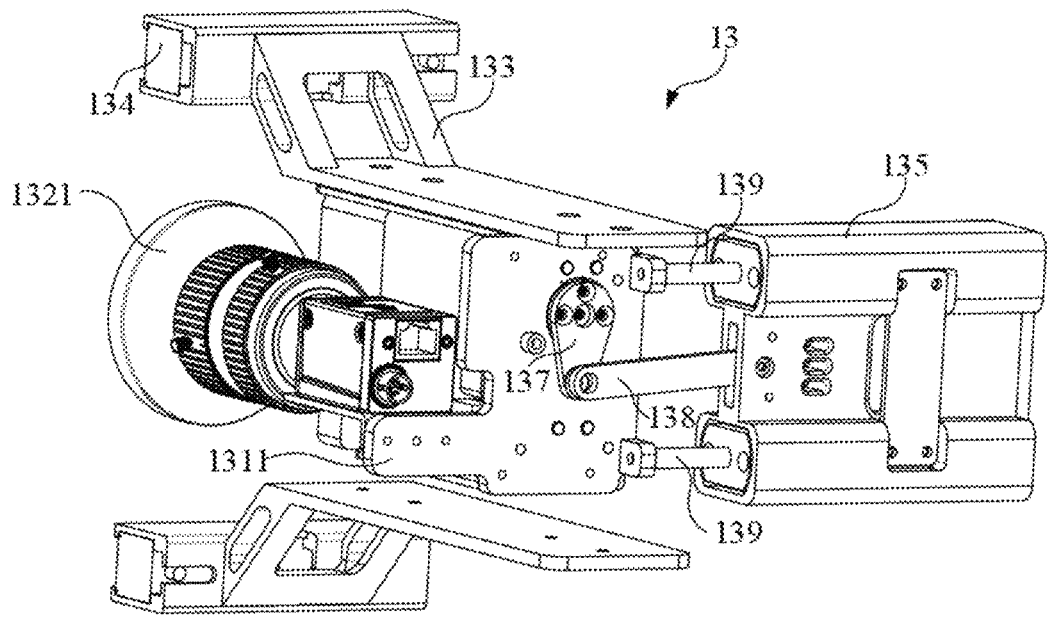
FIG. 5 is a structural diagram of yet another image acquisition member with the housing removed according to an embodiment of the present disclosure.

In the embodiments corresponding to FIG. 4 and FIG. 5, the number of the guide shafts 139 is two. A first end of the guide shaft 139 may be fixedly connected to the connection board 1311, and a second end of the guide shaft 139 is movably connected to the connection block 135 through the guide holes of the connection block 135. The guide shafts 139 may be respectively provided at both ends of one side of the connection board 1311. The cross section of the guide shafts 139 may be circular. In other embodiments, the number of the guide shafts 139 may be one, three or four etc., and the cross section of the guide shafts 139 may be rectangular, elliptical or other shape.

Further referring to FIG. 4 and FIG. 5, when the servo control board 1361 of the image acquisition member 13 does not receive the first instruction, the relative position of each component of the image acquisition member 13 is shown in FIG. 4. The connection block 135 is retracted. In this case, the controller can control the image acquisition component 132 to acquire the first image. When the servo control board 1361 of the image acquisition member 13 receives the first instruction, the servo control board 1361 may drive the servo 1362 to rotate, thereby driving the stem 137 to rotate relative to the connection board 1311. The rotation of the stem 137 can be clockwise or counterclockwise all the time. The rotation of the stem 137 drives the movement of the link 138, thereby driving the connection block 135 to be in an extended state. In this case, the relative position of each component of the image acquisition member 13 is shown in FIG. 5.

In the embodiments of the present disclosure, the moving member 11 may include the controller.

The controller is configured to send the second instruction to the lifting member 12 and the first instruction to the image acquisition member 13. The lifting member 12 is accordingly configured to move the image acquisition member 13 in the first direction based on the second instruction. The image acquisition member 13 is movable in the second direction based on the first instruction.

The controller may simultaneously send the first instruction to the image acquisition member 13 and the second instruction to the lifting member 12, so that the image acquisition member 13 will move in the first direction and in the second direction at the same time. The first instruction and the second instruction from the controller may not be sent at the same time.

In the embodiments of the present disclosure, the controller is configured to receive the first image for the target object from the image acquisition member 13, and send the first instruction to the image acquisition member 13 in response to determining that the mesh door exists in front of the target object based on the first image. The image acquisition member 13 is configured to acquire a second image for the target object after moving in the second direction based on the first instruction, and send the second image to the controller. The controller is configured to determine the feature information of the target object based on the first image and the second image when the image acquisition member 13 is at a current height.

In the embodiments of the present disclosure, the controller is configured to acquire a set of images acquired by the image acquisition member 13 at each of multiple different heights and obtain feature information of the target object based on the set of images at each of multiple different heights. Multiple sets of images are obtained based on the multiple different heights, and the multiple sets of images include the first image and the second image.

In an embodiment of the present disclosure, the controller is configured to receive a third image for the target object from the image acquisition member 13, determine a current environmental parameter based on the third image, and send a third instruction to the image acquisition member 13 in the case that the current environmental parameter is smaller than a target environment parameter. The image acquisition member 13 is configured to enable illumination of the light bar 134 in the image acquisition member 13 based on the third instruction.

In another embodiment of the present disclosure, the moving member 11 further includes a light sensor. The light sensor is configured to detect an ambient lightness and send the ambient lightness to the controller. The controller is accordingly configured to send the third instruction to the image acquisition member 13 in response to determining that the ambient lightness is smaller than a target ambient lightness. The image acquisition member 13 is configured to enable illumination of the light bar 134 in the image acquisition member 13 based on the third instruction.

It should be understood that when the image acquisition apparatus 1 is capturing the first device, the image acquisition member 13 can move from top to bottom or from bottom to top relative to the lifting member 12, and capture the first device during the movement. When the image acquisition apparatus 1 moves to the side of the second device and captures the second device, the image acquisition member 13 can also move from top to bottom or from bottom to top relative to the lifting member 12, and capture the second device during the movement.

It should be noted that for the description of the same operations and contents in this embodiment as those in other embodiments, reference can be made to the description in other embodiments, and the details will not be described herein again.

The image acquisition apparatus according to the embodiments of the present disclosure includes the image acquisition member including the image acquisition component. The image acquisition component includes the industrial camera, the thermal infrared camera and the monitoring camera, so that high-precision on-site images and thermal distribution information of the device in the computer room can be obtained and the operation status of the device in the computer room can be monitored. By providing the light bar on the image acquisition member, the image acquisition apparatus can still obtain clear device images in the dark environment, so as to better adapt to weak light and dark environment. Images of the device are captured when the connection block is continuously in the retracted or extended state in the housing. By such misaligned capture of the target object, the feature information of the device can still be obtained even when there is a mesh door in front of the device, so that the device can be detected without opening the door.

It should be noted that the above-mentioned controller may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller or a microprocessor. It can be understood that the electronic device that implements the above processor function may also be other, which is not specifically limited in the embodiments of the present disclosure.

In the several embodiments provided herein, it should be understood that the disclosed apparatus and method may be implemented in other manners. The apparatus embodiments described above are only illustrative. For example, the division of the units is only a logical function division. In actual implementation, there may be other division methods. For example, multiple units or components may be combined or may be integrated into another system, or some features may be ignored or not be implemented. In addition, the coupling, or direct coupling, or communication connection between the various components shown or discussed may be implemented through some interfaces, and the indirect coupling or communication connection of devices or units may be electrical, mechanical or in other forms.

In the description of the present disclosure, it should be understood that the terms "center", "longitudinal", "lateral", "length", "width", "thickness", "upper", "lower", "front", "back", "left", "right", "vertical", "horizontal", "top". "bottom", "inside", "outside", "clockwise", "counterclockwise" etc., are used to indicate relationship of orientation or position based on the orientation or position shown in the drawings, which are only for the convenience of describing the present disclosure and simplifying the description, rather than indicating or implying that the device or element referred to must have a specific orientation, or be constructed and operated in a specific orientation. Therefore, they should not be understood as restrictions on the present disclosure. In addition, the terms "first" and "second" are only used for descriptive purposes, and should not be construed as indicating or implying relative importance or implying the number of indicated technical features. Thus, features delimited with "first", "second" may expressly or implicitly include one or more of said features. In the description of the present disclosure, "multiple" means two or more, unless otherwise expressly and specifically defined.

In the description of the present disclosure, it should be noted that unless otherwise expressly specified and limited, the terms "installed", "linked" and "connected" should be understood in a broad sense. For example, it can be a fixed connection, a detachable connection or an integral connection. It can be a mechanical connection, an electrical connection or can communicate with each other. It can be a direct connection or an indirect connection through an intermediate medium. It can be internal communication of two elements or the interaction between two elements. The specific meaning of the above terms in the present disclosure may be understood by a person of ordinary skill in the art.

In the present disclosure, unless otherwise expressly specified and limited, the first feature being "on" or "under" the second feature may include direct contact between the first feature and the second feature, or may include that the first feature and the second feature are not in direct contact but in contact through another feature between them. Moreover, the first feature being "above", "over" and "on" the second feature includes the first feature being directly above and obliquely above the second feature, or simply indicates that the horizontal height of the first feature is higher than that of the second feature. The first feature being "below", "down" and "under" the second feature includes the first feature being directly below and obliquely below the second feature, or simply means that the horizontal height of the first feature is lower than that of the second feature.

The unit described above as a separate component may be or may not be physically separated, and the component displayed as a unit may be or may not be a physical unit, that is, it may be located in one place or distributed to multiple network units. Some or all of the units can be selected according to actual needs to achieve the purpose of the solution in the embodiments.

The apparatuses disclosed in the several apparatus embodiments of the present disclosure can be arbitrarily combined without conflict to obtain a new apparatus embodiment.

The foregoing description is merely a specific embodiment of the present disclosure, but the scope of protection of the present disclosure is not limited to this. Any change or replacement readily contemplated by those skilled in the art within the technical scope disclosed in the present disclosure shall fall within the scope of protection of the present disclosure. Accordingly, the scope of protection of the present disclosure shall be subject to the scope of protection of the claims.

INDUSTRIAL APPLICABILITY

In the embodiments of the present disclosure, the image acquisition apparatus includes a moving member, a lifting member and an image acquisition member. The moving member is movable on a bearing surface. The lifting member is provided on the moving member. The image acquisition member is movably connected to the lifting member and is movable in a first direction parallel to an axis of the lifting member and/or in a second direction vertical to the first direction. The image acquisition member can move at different positions relative to the lifting member, so that at least two images for the target object can be acquired at different positions in despite of the fact that there are still mesh doors in the images acquired by the image acquisition member. The overall structure of the target object can be obtained by analyzing the acquired at least two images, thereby avoiding the process of opening the doors in advance in the related art and improving the adaptability of the image acquisition apparatus to the inspection environment.

The invention claimed is:

1. An image acquisition apparatus comprising:
   a moving member movable on a bearing surface;
   a lifting member provided on the moving member; and
   an image acquisition member movably connected to the lifting member, wherein the image acquisition member is movable in at least one of a first direction parallel to an axis of the lifting member or a second direction vertical to the first direction,
   wherein the moving member comprises:
   a controller configured to send a second instruction to the lifting member and a first instruction to the image acquisition member,
   wherein the lifting member is configured to move the image acquisition member in the first direction based on the second instruction,
   wherein the image acquisition member is movable in the second direction based on the first instruction,
   wherein the controller is configured to:
      receive a first image for a target object from the image acquisition member; and
      send the first instruction to the image acquisition member in response to determining that a mesh door exists in front of the target object based on the first image,
   wherein the image acquisition member is configured to:
      acquire, after moving in the second direction based on the first instruction, a second image for the target object; and
      send the second image to the controller,
   wherein the controller is configured to determine, based on the first image and the second image, feature information of the target object when the image acquisition member is at a current height.

2. The image acquisition apparatus of claim 1, wherein the image acquisition member comprises:
   a housing having a first opening; and
   an image acquisition component disposed within the housing, and having a lens exposed through the first opening,
   wherein the moving member is configured to control operation of the image acquisition component.

3. The image acquisition apparatus of claim 2, wherein the image acquisition component comprises an industrial camera, a thermal infrared camera and a monitoring camera,
   wherein the industrial camera is configured to capture a target object to obtain feature information of the target object; the thermal infrared camera is configured to capture the target object to obtain thermal distribution information of the target object; and the monitoring camera is configured to acquire video information in real time.

4. The image acquisition apparatus of claim 2, wherein the image acquisition member further comprises:
   a bracket fixedly connected to the housing; and
   a light bar disposed on the bracket, the light bar being electrically connected to a controller in the moving member, and the controller being configured to control lighting of the light bar.

5. The image acquisition apparatus of claim 4, wherein the bracket comprises:
   a first bracket fixedly connected to the housing; and
   a second bracket fixedly connected to the housing,
   wherein the light bar comprises:
   a first light bar disposed on the first bracket; and
   a second light bar disposed on the second bracket,
   wherein the first light bar and the second light bar are respectively disposed on both sides of the image acquisition component.

6. The image acquisition apparatus of claim 2, wherein the housing has a second opening; and the image acquisition member further comprises:
   a connection block partially passing through the second opening, wherein a first end of the connection block is inside the housing; a second end of the connection block is outside the housing; and the second end of the connection block is movably connected to the lifting member; and
   a drive mechanism connected to the first end of the connection block, wherein the drive mechanism is configured to control the connection block to move in the second direction.

7. The image acquisition apparatus of claim 6, wherein the drive mechanism comprises:
   a drive component connected to a first end of a stem and configured to drive the stem to rotate;
   the stem, having a second end connected to a first end of a link; and
   the link, having a second end connected to the first end of the connection block, wherein the stem is configured to, when being rotated, drive the link to move; and the movement of the link drives the connection block to move in the second direction.

8. The image acquisition apparatus of claim 7, wherein the drive component comprises:
a servo control board electrically connected to the controller in the moving member, wherein the servo control board is configured to receive a first instruction from the controller and control operation of a servo based on the first instruction; and
the servo, configured to, when operating, drive the stem to rotate.

9. The image acquisition apparatus of claim 7, wherein the drive mechanism further comprises:
at least one guide shaft fixedly disposed relative to the housing and parallel to the second direction,
wherein the connection block has at least one guide hole matched with the at least one guide shaft; the at least one guide shaft is movably connected to the connection block through the at least one guide hole; and the at least one guide shaft cooperates with the at least one guide hole to enable the connection block to move in the second direction.

10. The image acquisition apparatus of claim 1, wherein the controller is configured to: at each of a plurality of different heights,
acquire a set of images acquired by the image acquisition member; and
obtain feature information of the target object based on the set of images,
wherein a plurality of sets of images are obtained based on the plurality of different heights, the plurality of sets of images comprising the first image and the second image.

11. The image acquisition apparatus of claim 1, wherein the controller is configured to:
receive a third image for the target object from the image acquisition member;
determine, based on the third image, a current environmental parameter; and
send a third instruction to the image acquisition member in the case that the current environmental parameter is smaller than a target environment parameter,
wherein the image acquisition member is configured to enable illumination of a light bar in the image acquisition member based on the third instruction.

12. The image acquisition apparatus of claim 1, wherein the moving member further comprises:
a light sensor configured to detect an ambient lightness and send the ambient lightness to the controller,
wherein the controller is configured to send a third instruction to the image acquisition member in response to determining that the ambient lightness is smaller than a target ambient lightness,
wherein the image acquisition member is configured to enable illumination of a light bar in the image acquisition member based on the third instruction.

13. An image acquisition apparatus comprising:
a moving member movable on a bearing surface;
a lifting member provided on the moving member; and
an image acquisition member movably connected to the lifting member, wherein the image acquisition member is movable in at least one of a first direction parallel to an axis of the lifting member or a second direction vertical to the first direction,
wherein the image acquisition member comprises:
a housing having a first opening; and
an image acquisition component disposed within the housing, and having a lens exposed through the first opening,
wherein the moving member is configured to control operation of the image acquisition component,
wherein the housing has a second opening; and the image acquisition member further comprises:
a connection block partially passing through the second opening, wherein a first end of the connection block is inside the housing; a second end of the connection block is outside the housing; and the second end of the connection block is movably connected to the lifting member; and
a drive mechanism connected to the first end of the connection block, wherein the drive mechanism is configured to control the connection block to move in the second direction,
wherein the drive mechanism comprises:
a drive component connected to a first end of a stem and configured to drive the stem to rotate;
the stem, having a second end connected to a first end of a link; and
the link, having a second end connected to the first end of the connection block,
wherein the stem is configured to, when being rotated, drive the link to move; and the movement of the link drives the connection block to move in the second direction.

14. The image acquisition apparatus of claim 13, wherein the image acquisition component comprises an industrial camera, a thermal infrared camera and a monitoring camera,
wherein the industrial camera is configured to capture a target object to obtain feature information of the target object; the thermal infrared camera is configured to capture the target object to obtain thermal distribution information of the target object; and the monitoring camera is configured to acquire video information in real time.

15. The image acquisition apparatus of claim 13, wherein the image acquisition member further comprises:
a bracket fixedly connected to the housing; and
a light bar disposed on the bracket, the light bar being electrically connected to a controller in the moving member, and the controller being configured to control lighting of the light bar.

16. The image acquisition apparatus of claim 15, wherein the bracket comprises:
a first bracket fixedly connected to the housing; and
a second bracket fixedly connected to the housing,
wherein the light bar comprises:
a first light bar disposed on the first bracket; and
a second light bar disposed on the second bracket,
wherein the first light bar and the second light bar are respectively disposed on both sides of the image acquisition component.

17. The image acquisition apparatus of claim 13, wherein the drive component comprises:
a servo control board electrically connected to the controller in the moving member, wherein the servo control board is configured to receive a first instruction from the controller and control operation of a servo based on the first instruction; and
the servo, configured to, when operating, drive the stem to rotate.

18. The image acquisition apparatus of claim 13, wherein the drive mechanism further comprises:

at least one guide shaft fixedly disposed relative to the housing and parallel to the second direction, wherein the connection block has at least one guide hole matched with the at least one guide shaft; the at least one guide shaft is movably connected to the connection block through the at least one guide hole; and the at least one guide shaft cooperates with the at least one guide hole to enable the connection block to move in the second direction.

19. The image acquisition apparatus of claim 13, wherein the moving member comprises:

a controller configured to send a second instruction to the lifting member and a first instruction to the image acquisition member, wherein the lifting member is configured to move the image acquisition member in the first direction based on the second instruction, wherein the image acquisition member is movable in the second direction based on the first instruction.

20. The image acquisition apparatus of claim 13, wherein the controller is configured to:

receive a third image for the target object from the image acquisition member;

determine, based on the third image, a current environmental parameter; and send a third instruction to the image acquisition member in the case that the current environmental parameter is smaller than a target environment parameter, wherein the image acquisition member is configured to enable illumination of a light bar in the image acquisition member based on the third instruction.

* * * * *